(12) United States Patent
Klug et al.

(10) Patent No.: US 6,566,309 B1
(45) Date of Patent: May 20, 2003

(54) ADDITIVES FOR INHIBITING GAS HYDRATE FORMATION

(75) Inventors: Peter Klug, Grossostheim (DE); Michael Feustel, Köngernheim (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/562,931

(22) Filed: May 2, 2000

(30) Foreign Application Priority Data

May 3, 1999 (DE) .......................... 199 20 152

(51) Int. Cl.⁷ ............................. C09K 3/00; C07C 9/00
(52) U.S. Cl. ................... 507/90; 507/246; 585/15; 585/950
(58) Field of Search ............ 585/15, 950; 507/90, 507/246

(56) References Cited

U.S. PATENT DOCUMENTS

| | | | | |
|---|---|---|---|---|
| 4,973,775 A | * | 11/1990 | Sugier et al. ............... | 585/15 |
| 5,331,105 A | * | 7/1994 | Duncum et al. ............. | 585/15 |
| 5,817,898 A | | 10/1998 | Delion et al. | |

FOREIGN PATENT DOCUMENTS

| | | |
|---|---|---|
| FR | 2 407 258 | 5/1979 |
| WO | WO 94/12761 | 6/1994 |
| WO | WO 96/08456 | 3/1996 |
| WO | WO 96/08636 | 3/1996 |
| WO | WO 96/08672 | 3/1996 |
| WO | WO 96/41785 | 12/1996 |
| WO | WO 98/23843 | 6/1998 |

OTHER PUBLICATIONS

Derwent Patent Family Abstract for FR 2 407 258, (1979).

* cited by examiner

*Primary Examiner*—Philip Tucker
(74) *Attorney, Agent, or Firm*—Richard P. Silverman

(57) ABSTRACT

The invention relates to the use of compounds of the formula (1)

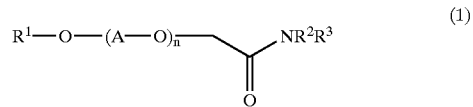

in which $R^1$ is $C_1$–$C_{30}$-alkyl, $C_2$–$C_{30}$-alkenyl or a group of the formula —$CH_2$—CO—$NR^2R^3$ or a $C_6$–$C_{18}$-aryl radical which may be substituted by a $C_1$–$C_{12}$-alkyl group, $R^2$, $R^3$ independently of one another, are hydrogen, $C_1$–$C_6$-alkyl or $C_5$–$C_7$-cycloalkyl, or $R^2$ and $R^3$, including the nitrogen atom to which they are bonded, form a ring of 4 to 8 ring atoms, it being possible for the ring also to contain oxygen or nitrogen atoms in addition to carbon atoms, A is a $C_2$–$C_4$-alkylene radical and n is an integer from 1 to 20, as gas hydrate inhibitors.

7 Claims, No Drawings

ADDITIVES FOR INHIBITING GAS HYDRATE FORMATION

BACKGROUND OF THE INVENTION (1) Field of the Invention

The present invention relates to an additive and a process for inhibiting nucleation, growth and/or agglomeration of gas hydrates by adding an effective amount of an inhibitor which contains the amides of polyglycol ether carboxylic acids to a multiphase mixture tending to hydrate formation and comprising water, gas and possibly condensate or to drilling fluid tending to gas hydrate formation.

Gas hydrates are crystalline clathrate compounds of gas molecules in water, which form under specific temperature and pressure conditions (low temperature and high pressure). The water molecules form cage structures around the corresponding gas molecules. The framework formed from the water molecules is by itself thermodynamically unstable and is stabilized only by the inclusion of gas molecules, resulting in an ice-like compound which, depending on pressure and gas composition, can also exist in the freezing point of water (up to more than 25° C.). A view of this subject of gas hydrates is given in Sloan, Clathrate Hydrates of Natural Gases, M. Dekker, New York, 1990.

In the petroleum and natural gas industry, in particular the gas hydrates which form from water and the natural gas components methane, ethane, propane, isobutane, n-butane, nitrogen, carbon dioxide and hydrogen sulfide are of considerable importance. Particularly in present day natural gas production, the existence of these gas hydrates presents a major problem especially when wet gas or multiphase mixtures comprising water, gas and alkane mixtures under high pressure are exposed to low temperatures. Here, owing to their insolubility and crystalline structure, the formation of gas hydrates leads to blockage of a very wide range of transport means, such as pipelines, valves or production systems in which wet gas or multiphase mixtures are transported over long distances at low temperatures, as occurs in particular in colder regions of the world or on the seabed.

In addition, gas hydrate formation can lead to problems also in the drilling process for developing new gas or petroleum deposits under corresponding and temperature conditions by virtue of the fact that gas hydrates form in the drilling fluids.

To avoid such problems, the gas hydrate formation in gas pipelines, during transport of multiphase mixtures or in drilling fluids can be suppressed by using relatively large amounts (two-digit percentage amounts, based on the aqueous phase) of lower alcohols, such as methanol, glycol or diethylene glycol. The addition of these additives of these additives shifts the thermodynamic limit of gas hydrate formation to lower temperatures and higher pressures (thermodynamic inhibition). However, the addition of these thermodynamic inhibitors gives rise to greater safety problems (flash point and toxicity of the alcohols), logistic problems (greater storage tanks, recycling of these solvents) and accordingly high costs, especially in offshore production.

Today, attempts are therefore being made to replace thermodynamic inhibitors by adding, in the temperature and pressure ranges in which gas hydrates can form, additives (amount used <2%) which either delay the gas hydrate formation (kinetic inhibitors) or keep the gas hydrate agglomerates small and therefore pumpable so that they can be transported through the pipeline (so-called agglomerate inhibitors or anti-agglomerates). The inhibitors used either prevent the nucleation and/or the growth of the gas hydrate particles or modify the hydrate growth in such a way that smaller hydrate particles result.

In addition to the known thermodynamic inhibitors, a large number of monomeric as well as polymeric classes of substances which are kinetic inhibitors or agglomerate inhibitors have been described as gas hydrate inhibitors in the patent literature.

(2) Description of the Related Art

WO-A-96/08636 describes surface-active substances as gas hydrate inhibitors, which carry a polar head group and a hydrophobic radical, the hydrophobic radical containing not more than 12 carbon atoms. Sodium valerate, butanol, butyl sulfate and butyl sulfonate, alkylpyrrolidones and a zwitterion of the formula $R_2N(CH_3)_2$—$(CH_2)_4SO_3^-$ are mentioned as examples. WO-A-96/08456 describes synergistic mixtures of the abovementioned substances with water-soluble copolymers. FR-A-2 407 258 describes amides of carboxymethylated oligomeric polyethylene glycol monoalkyl ethers of the structure $RO(CH_2CH_2O)_nCH_2CONR^1R^2$, R being an aliphatic radical having 8–20 carbon atoms or a phenyl radical substituted by a $C_8$–$C_{12}$-alkyl radical and $R^1$ and $R^2$ are hydrogen or alkyl radicals having at least 3 carbon atoms, and their use as corrosions inhibitors, detergent additives or anti-pollution additives for fuels.

U.S. Pat. No. 5,817,898 describes polymers of the formula Hb-A-X-A-Hb as inhibitors of gas hydrate formation, X being a polyoxyalkylene chain, A being a urethane group and Hb being an alkyl, alkylaryl or cycloalkyl group.

SUMMARY OF THE INVENTION

To be able to use gas hydrate inhibitors also with greater supercooling than currently possible, i.e. further within the hydrate region, further increase the effectiveness of the available inhibitors as required. In addition, products improved with respect to their biodegradability and toxicity are required. It was therefore the object of the present invention to provide additives which are further improved and which slow down the formation of gas hydrates (kinetic inhibitors) or keep the gas hydrate agglomerates small and pumpable (anti-agglomerates) in order to be able to replace the thermodynamic inhibitors (methanol and glycols) which are still used at present and give rise to considerable safety problems and logistic problems.

As has now surprisingly been found, modified polymers of glycol ether amides are effective as gas hydrate inhibitors. Depending on the structure, the products suppress the nucleation or the growth or the agglomeration of gas hydrates and reinforce the effect of conventional gas hydrate inhibitors already described.

DESCRIPTION OF THE PREFERRED EMBODIMENTS

The invention therefore relates to the use of compounds of the formula (1)

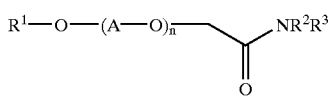  (1)

in which
R¹ is $C_1$–$C_{30}$-alkyl, $C_2$–$C_{30}$-alkenyl or a group of the formula —$CH_2$—CO—$NR^2R^3$ or a $C_6$–$C_{18}$-aryl radical which may be substituted by a $C_1$–$C_{12}$-alkyl group,
$R^2$, $R^3$ independently of one another, are hydrogen, $C^1$–$C_6$-alkyl or $C_5$–$C_7$-cycloalkyl, or $R^2$ and $R^3$, including the nitrogen atom to which they are bonded, form a ring of 4 to 8 ring atoms, it being possible for the ring also to contain oxygen or nitrogen atoms in addition to carbon atoms,
A is a $C_2$–$C_4$-alkylene radical and
n is an integer from 1 to 20,
as gas hydrate inhibitors.

Depending on the type of application, R¹ is preferably $C_1$–$C_8$-alkyl or $C_8$–$C_{30}$-alkyl. $R^2$ and $R^3$ are preferably hydrogen or $C_1$–$C_4$-alkyl. A is preferably an ethylene radical and n is an integer from 2 to 10.

The compounds of the formula (1) are obtainable from polyglycol monoalkyl ethers or polyalkylene glycols by first converting the polyglycol into the corresponding alkylated carboxylic acid. This can be effected by oxidation of the terminal $CH_2OH$ group to give the carboxyl function or reaction of the glycol ether with chloroacetic acid or acrylic acid derivatives by methods known from the literature.

Examples of glycol ethers suitable as starting materials are polyethylene glycols having molecular weights of 100–1000 g/mol, ethylene oxide/propylene oxide copolymer (block or random copolymers), methylpolyglycols, butylpolyglycols and isobutylpolyglycols as well as glycol ethers based on octanol, 2-ethylhexanol, decanol, isodecanol, dodecanol, tetradecanol, hexadecanol, octadecanol, oleyl alcohol or synthetic or natural fatty alcohol cuts. Glycol ethers based on alkylphenols having a $C_1$–$C_{12}$-alkyl group are also suitable.

The ether carboxylic acids obtained are then reacted with the corresponding mono- or dialkylamines with elimination of water to give the corresponding ether carboxamide. The amidation can be carried out with or without the use of catalysts at reaction temperatures of from 80 to 200° C., preferably from 100 to 180° C.

Suitable amines are amines having 1–10 carbon atoms, such as methylamine, ethylamine, propylamine, n-butylamine, isobutylamine, sec-butylamine, pentylamines, hexylamines, dimethylamine, diethylamine, dipropylamines, dibutylamine, diisopropylamine, diisobutylamine, pyrrolidine, piperidine or morpholine. Amines having $C_3$–$C_5$-alkyl radicals or cyclic amines having 5 to 7 chain members are particularly suitable, and diethylamine, isopropylamine, isobutylamine, isopentylamine, piperidine and pyrrolidine are particularly preferred.

The compounds can be used alone or in combination with other known gas hydrate inhibitors. In general, the gas hydrate inhibitor according to the invention is added to the system tending to hydrate formation in an amount such that adequate inhibition is obtained under the given pressure and temperature conditions. The gas hydrate inhibitors according to the invention are used in amounts such that their concentration in the aqueous phase in which the gas hydrate formation is to be prevented is from 0.01 to 2% by weight (based on the weight of the aqueous phase), corresponding to 100–20,000 ppm, preferably from 0.02 to 1% by weight. If the gas hydrate inhibitors according to the invention are used as a mixture with other gas hydrate inhibitors within the scope of this invention, the concentration of the mixture is from 0.01 to 2 or 0.02 to 1% by weight in the aqueous phase.

Depending on the structure of the polymeric glycol ether amide, additives which inhibit the gas hydrate formation in different ways can be obtained:

A short alkyl radical R¹ (about $C_1$–$C_8$) or a high ethylene oxide content gives water-soluble products which suppress the nucleation of the gas hydrates and act as kinetic ihibitors or, as synergistic components, are capable of reinforcing the effect of other kinetic inhibitors, as shown in the attached examples.

A longer alkyl radical R¹ (about $C_8$–$C_{30}$) or lower contents of ethylene oxide or the use of propylene oxide gives more hydrophobic amides having surfactant character which wet the surface of gas hydrate particles with oil and hence prevent the agglomeration of the hydrates; they thus act as agglomerate inhibitors. The agglomerate inhibitors are in general at least partly soluble in the condensate phase of the multiphase mixture.

Furthermore, mixtures of the compounds according to formula (1) with one or more polymers having a carbon backbone obtained by polymerization and amide bonds in the side chains are particularly suitable as gas hydrate inhibitors and hence a preferred embodiment of this invention. These include in particular polymers such as polyvinylpyrrolidone, polyvinylcaprolactam, polyiisopropylacrylamide, polyacryloylpyrrolidine, copolymers of vinylpyrrolidone and vinylcaprolactam, copolymers of vinylcaprolactam and N-methyl-N-vinylacetamide and terpolymers of vinylpyrrolidone, vinylcaprolactam and further anionic, cationic and neutral comonomers having a vinylic double bond, such as 2-dimethylaminomethacrylate, 1-olefins, N-alkylacrylamides, N-vinylacetamide, acrylamide, sodium 2-acrylamido-2-methyl-1-propanesulfonate (AMPS) or acrylic acid. Furthermore, mixtures with homo- and copolymers of N,N-dialkylacrylamides, such as N-acryloylpyrrolidine, N-acryloylmorpholine and N-acryloylpiperidine or N-alkylacrylamides such as isopropylacrylamide are also suitable. Mixtures with alkylpolyglycosides, hydroxyethylcellulose, carboxymethylcellulose and other ionic or nonionic surfactant molecules are also suitable.

In a preferred embodiment of the invention, the gas hydrate inhibitors according to the invention are used as a mixture with polymers which are disclosed in WO-A-96/08672. These polymers are those which have structural units of the formula

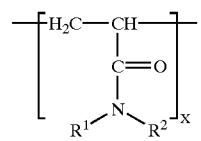

in which
R¹ is a hydrocarbon group having 1 to 10 carbon atoms and 0 to 4 heteroatoms, selected from N, O and S,
R² is a hydrocarbon group having the same definition as R¹, and X is the average number of the repeating units, the latter being such that the polymer has a molecular weight of from 1000 to 6 000 000. For use within the scope of the present invention, polyisopropylacrylamides and polyacryloylpyrrolidines are particularly suitable.

In a further preferred embodiment of the invention, the gas hydrate inhibitors according to the invention are used as a mixture with polymers which are disclosed in WO-A-96/41785. This document discloses gas hydrate inhibitors comprising structural units

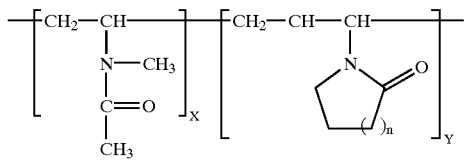

in which n is a number from 1 to 3 and x and y are the number of repetitive units, which are such that the molecular weight of the polymers is from 1000 to 6 000 000. For use within the scope of the present invention, copolymers of N-vinylcaprolactam and N-vinyl-N-methylacetamide or vinylpyrrolidone are particularly suitable.

In a further preferred embodiment of the invention, the gas hydrate inhibitors according to the invention are used as a mixture with other polymers which are disclosed in WO-A-94/12761. The document discloses additives for preventing the formation of gas hydrates, which contain polymers comprising cyclic substituents having from 7 to 7 ring members. For use within the scope of the present invention, polyvinylcaprolactam, polyvinylpyrrolidone and hydroxyethylcellulose are particularly suitable.

Also particularly suitable are mixtures of the polymers according to the invention with maleic anhydride-based gas hydrate inhibitors, as described in WO-A-97/6506, in particular maleic anhydride copolymers reacted with mono- and/or diamines. Among these, especially modified vinyl acetate/maleic anhydride copolymers are particularly preferred. If mixtures are used, the concentration ratios of the gas hydrate inhibitors according to the invention to the admixed components are from 90:10 to 10:90 percent by weight, and mixtures in the ratios of from 75:25 to 25:75, and in particular from 60:40 to 40:60, are preferably to be used. In petroleum and natural gas production or in the preparation of drilling fluids, the compounds, as well as their mixtures with other gas hydrate inhibitors, can be added to the multiphase mixture susceptible to hydrate formation by means of conventional equipment, such as injection pumps or the like; owing to the good solubility of the polymers according to the invention, the inhibitor is rapidly and uniformly distributed in the aqueous phase tending to hydrate formation or in the condensate phase. Since the inhibition primarily delays the formation and the growth of hydrate nuclei or prevents agglomeration, the inhibitor is preferably added before gas hydrate formation occurs, i.e. at above the equilibrium temperature of the hydrate formation. This is the case, for example, if the inhibitor is added, for example, directly at the natural gas source or at the beginning of the pipeline in which inhibition is, to be effected.

To investigate the inhibitory effect of the experimental products, a stirred steel autoclave with temperature control, pressure sensor and torque transducer and an internal volume of 450 ml was used and was filled with distilled water and gas in a volume ratio of 20:80. 90 bar natural gas was then forced in.

Starting from an initial temperature of 17.5° C., cooling was effected to 2° C. in the course of 2 h, followed by stirring for 18 h at 2° C. and further heating to 17.5° C. in the course of 2 h. First, a decrease in pressure according to the thermal expansion of the gas is observed. If the formation of gas hydrate nuclei occurs during the supercooling time, the measured pressure decreases, an increase in the measured torque being observed; without an inhibitor, further growth and increased agglomeration of these hydrate nuclei rapidly lead to a further increase in the measured torque. On heating of the reaction mixture, the gas hydrates decompose again so that the initial state is reached again at the end of the experiment.

The time from when the minimum temperature of 2° C. is reached to the initial gas absorption ($T_{ind}$) or the time required for the increase in the torque ($T_{agg}$) is used as a measure of the inhibitory effect of the experimental product. Long induction times or agglomeration times indicate a kinetic inhibitor effect. On the other hand, the torque measured in the test autoclave serves as a parameter for the agglomeration of the hydrates crystals. In the case of a good agglomeration inhibitor, the torque established after the formation of gas hydrates is substantially reduced compared with the blank value. Ideally, snow-like, fine hydrate crystals form in the condensate phase present and do not agglomerate and in practice do not block the installations serving for gas transport and conveying.

EXAMPLES

Example 1

Butylpolyglycol-ether-N-isobutylcarboxamide 92.0 g (0.27 mol, moles used, determined from the acid number; obtained from this precursor via Williamson ether synthesis) of an ethercarboxylic acid based on butanol+3.5 ethylene oxide were initially introduced under a nitrogen atmosphere into a 250 ml four-necked flask with a stirrer and distillation bridge, and 11.6 g of water contained were distilled off at 150° C. A total of 29.6 g (0.40 mol) of isobutylamine were then added dropwise in portions in the course of 6 h, and in each case an amine/water mixture was distilled off. The final water of reaction was distilled off at 135° C./25 mbar, and the sample was then filtered hot. 101 g of a clear, brownish liquid, acid number 7.9 mg KOH/g, amide nitrogen: 4.1%, which dissolves in water to give an opaque solution, is obtained.

Example 2

Butylpolyglycol-ether-N-pyrrolidinecarboxamide 327 g of a brown, clear oil, acid number 7.4 mg KOH/g, amide nitrogen 3.9%, which dissolves in water to give a clear solution, were isolated from 350 g (1.00 mol) of an ethercarboxylic acid based on butanol+3.5 ethylene oxide and 142 g of pyrrolidine (2.00 mol), analogously to Example 1.

Example 3

PEG 400-ether-N,N-bisisobutylcarboxamide 170 g of a brown, clear oil, acid number 20.9 mg KOH/g, amide nitrogen 4.4%, which dissolves in water to give a clear solution, were isolated from 243 g (0.259 mol) of a diethercarboxylic acid based on polyethylene glycol 400 (contains water, about 58% of active substance) and 87.9 g of isobutylamine (1.20 mol), analogously to Example 1.

Example 4

Methylpolyglycol-ether-N-isobutylcarboxamide 156 g of a brown, clear oil, acid number 3.0 mg KOH/g, amide nitrogen 3.1%, which dissolves in water to give a clear solution, were isolated from 150 g (0.40 mol) of an ethercarboxylic acid based on a methylpolyglycol having an average molecular weight of 350 g/mol (anhydrous) and 34.3 g of isobutylamine (0.47 mol), analogously to Example 1.

Example 5

Emulsogen COA 070-isobutylamide WR 98/143

303 g of a brown, clear oil having an acid number of 2.3 mg KOH/g were isolated from 329.4 g (0.50 mol according to acid number) of an ethercarboxylic acid based on C14/15-oxo alcohol+7 ethylene oxide and 55.1 g of isobutylamine (0.75 mol), analogously to Example 1.

Example 6

511 g of a brown, clear oil having an acid number of 3.2 mg KOH/g and 2.34% of amide nitrogen were isolated from 538 g (1.00 mol according to acid number) of an ethercarboxylic acid based on n-octanol+8 ethylene oxide and 82.8 g of isobutylamine (1.13 mol), analogously to Example 1.

Example 7

715.4 g of a brown, clear oil having an acid number of 2.1 mg KOH/g and 1.78% of amide nitrogen were isolated from 787 g (1.00 mol according to acid number) of an ethercarboxylic acid based on oleyl alcohol/cetyl alcohol+8 ethylene oxide and 87.8 g of isobutylamine (1.20 mol), analogously to Example 1.

Comparative Example 1

A vinyl acetate/maleic anhydride copolymer modified with isobutylamine and 3-diethylaminopropylamine was used as a comparative substance. It was present as a 25% strength solution in butyl glycol/water.

Comparative Example 2

A solution of polyvinylcaprolactam in butylglycol was used as a comparative substance; molecular weight about 5000 g/mol.

Test results

Composition of the natural gas: methane: 87.6%, ethane: 1.26%, propane: 0.08%, butanes: 0.02%, carbon dioxide: 0.35%, nitrogen: 10.61%. Supercooling below the equilibrium temperature of hydrate formation at 65 bar: 7° C. Supercooling at 90 bar: 8.5° C.

| Substance A | Dosage of substance A | Substance B | Dosage of substance B | p (bar) | $T_{ind}$ (h) | $T_{agg}$ (h) |
|---|---|---|---|---|---|---|
| — | — | — | — | 64 | 0 | 0 |
| — | — | — | — | 90 | 0 | 0 |
| Example 1 | 5000 | — | — | 64 | 10.3 | 11.6 |
| Example 2 | 5000 | — | — | 65 | 12.1 | 12.9 |
| Example 3 | 5000 | — | — | 64 | 3 | 3.2 |
| Example 1 | 5000 | — | — | 92 | 0.2 | 0.9 |
| Example 3 | 5000 | — | — | 94 | 0 | 0.2 |
| Example 1 | 2500 | Comp. 1 | 2500 | 95 | 5.8 | 5.8 |
| — | — | Comp. 1 | 5000 | 95 | 0.2 | 0.2 |
| — | — | Comp. 2 | 2500 | 90 | 5.2 | |
| Example 1 | 2500 | Comp. 2 | 2500 | 90 | >16 | |

As is evident from the above test results, the products according to the invention act even by themselves as kinetic hydrate inhibitors at low pressures or with supercooling (64 bar, Examples 1 to 3).

In the further Examples, it is shown that the products form synergistic mixtures with other hydrate inhibitors; thus, a mixture of Example 1 and Comparison 1 at 95 bar has a substantial effect (about 6 h compared with 0 h in the case of the blank value), although both components alone produce values in the region of the blank value at the same pressure.

A reinforcing effect also occurs on mixing Example 1 with polyvinylcaprolactam (Comparison Example 2), while PVCap in a dose of 2500 ppm gives only 5 h induction time, this increases to >18 h, if 2500 ppm of Example 1 are added, although Example 1 alone is not effective at >90 bar, even with a dosage of 5000 ppm. To test the effect as agglomerate inhibitors, water and mineral spirit were initially introduced into the test autoclave used above (together 20% of the volume, volume ratio water to mineral spirit=1:2) and 5000 ppm, based on the aqueous phase, of the respective additive were added. At an autoclave pressure of 90 bar and a stirrer speed of 5000 rpm, the temperature of the autoclave was reduced from 17.5 to 2° C. in the course of 2 h, after which stirring was carried out for 16 h at 2° C., followed by heating up again. The induction time up to the occurrence of the initial hydrate formation (starting from when complete supercooling was reached) and the resulting torque of the stirrer were measured, said torque being a measure of the agglomeration of the gas hydrates. As is evident from the examples, in Examples 1 and 5 the measured torques were substantially reduced compared with the blank value, in spite of faster and more vigorous hydrate formation, which was accompanied by a substantial temperature peak. This indicates a substantial agglomerate-inhibiting effect of the products according to the invention. Surprisingly, under the test conditions the products additionally had a substantial effect as kinetic inhibitors, and no hydrate formation was observed in Examples 6 and 7.

| Substance | Dosage | $T_{ind}$ (h) | $M_{max}$ (Ncm) |
|---|---|---|---|
| No additive | — | 0.1 | 15.9 |
| Example 1 | 5000 ppm | 5.9 | 0.4 |
| Example 5* | 5000 ppm | 10.2 | 1.6 |
| Example 6 | 5000 ppm | >16 | n.b. |
| Example 7 | 5000 ppm | >16 | n.b. |

*Mean of 3 measurements

What is claimed is:
1. A method of inhibiting gas hydrate formation in a multiphase mixture comprising combining the multiphase mixture with compounds of the formula (1)

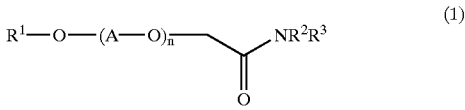

in which
R$^1$ is C$_1$–C$_{30}$-alkyl, C$_2$–C$_{30}$-alkenyl or a group of the formula —CH$_2$—CO—NR$^2$R$^3$ or an aryl radical which is substituted by a C$_1$–C$_{12}$-alkyl group, R$^2$, R$^3$ independently of one another, are hydrogen, C$_1$–C$_6$-alkyl or C$_5$–C$_7$-cycloalkyl, or R$^2$ and R$^3$, including the nitrogen atom to which they are bonded, form a ring of 4 to 8 ring atoms, it being possible for the ring also to contain oxygen or nitrogen atoms in addition to carbon atoms, A is a $C_2$–$C_4$-alkylene radical and n is an integer from 1 to 20.

2. The method of claim 1 wherein $R^1$ is $C_1$–$C_8$-alkyl.

3. The method of claim 1 wherein $R^1$ is $C_8$–$C_{30}$-alkyl.

4. The method of claim 1 wherein $R^2$ and $R^3$, independently of one another are hydrogen or $C_1$–$C_4$-alkyl.

5. The method of claim 1 wherein A is an ethylene radical.

6. The method of claim 1 wherein n is a number from 2 to 10.

7. An additive for inhibiting gas hydrate formation, comprising

A) a compound of the formula 1

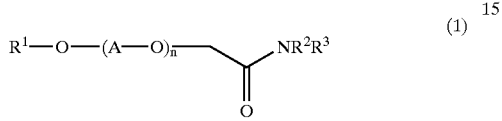

(1)

in which
- $R^1$ is $C_1$–$C_{30}$-alkyl, $C_2$–$C_{30}$-alkenyl or a group of the formula —$CH_2$—CO—$NR^2R^3$ or an aryl radical which is substituted by a $C_1$–$C_{12}$-alkyl group,
- $R^2$, $R^3$ independently of one another, are hydrogen, $C_1$–$C_6$-alkyl or $C_5$–$C_7$-cycloalkyl, or $R^2$ and $R^3$, including the nitrogen atom to which they are bonded, form a ring of 4 to 8 ring atoms, it being possible for the ring also to contain oxygen or nitrogen atoms in addition to carbon atoms,
- A is a $C_2$–$C_4$-alkylene radical and
- n is an integer from 1 to 20, and B) at least one water-soluble polymer selected from polyisopropylacrylamide, polyacryloylpyrrolidine, polyvinylcaprolactam, polyvinylpyrrolidone, copolymers of vinylcaprolactam with vinylpyrrolidone or N-vinyl-N-methylacetamide and copolymers which contain structural units of maleic acid or its anhydride or amide derivatives.

\* \* \* \* \*